E. W. FOX.
ADJUSTABLE SEAT.
APPLICATION FILED AUG. 2, 1917.

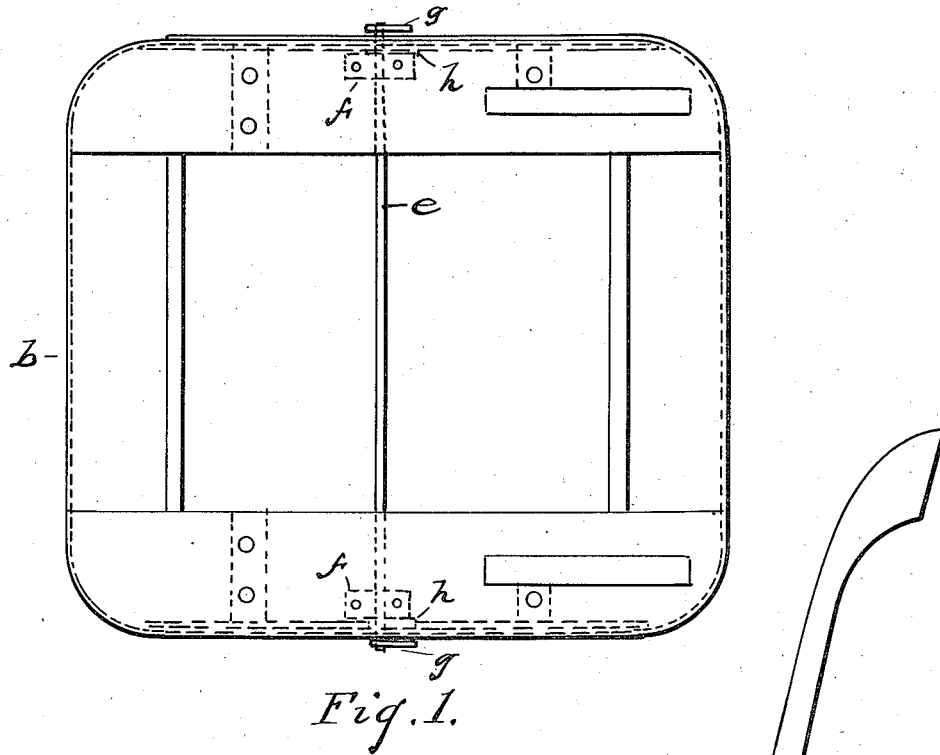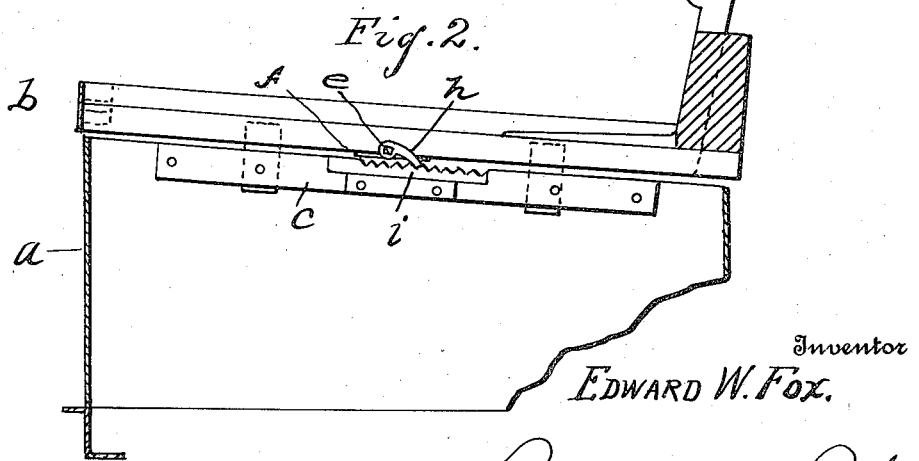

1,276,203.

Patented Aug. 20, 1918.
2 SHEETS—SHEET 2.

Inventor
EDWARD W. FOX.
By Ralzemond A. Parker
Attorney

UNITED STATES PATENT OFFICE.

EDWARD W. FOX, OF DETROIT, MICHIGAN, ASSIGNOR TO FISHER BODY CORPORATION, OF DETROIT, MICHIGAN.

ADJUSTABLE SEAT.

1,276,203.

Specification of Letters Patent.  Patented Aug. 20, 1918.

Application filed August 2, 1917. Serial No. 184,007.

*To all whom it may concern:*

Be it known that I, EDWARD W. FOX, a citizen of the United States, residing at Detroit, county of Wayne, State of Michigan, have invented a certain new and useful Improvement in Adjustable Seats, and declare the following to be a full, clear, and exact description of the same, such as will enable others skilled in the art to which it pertains to make and use the same, reference being had to the accompanying drawings, which form a part of this specification.

This invention relates to adjustable seats, especially adjustable seats for automobile bodies designed so that the seat may be adjusted backward or forward of the chassis to give proper leg room.

In the drawings—

Figure 1 is a plan view of the seat, the seat cushion being removed.

Fig. 2 is a vertical section of the same.

Figure 3:
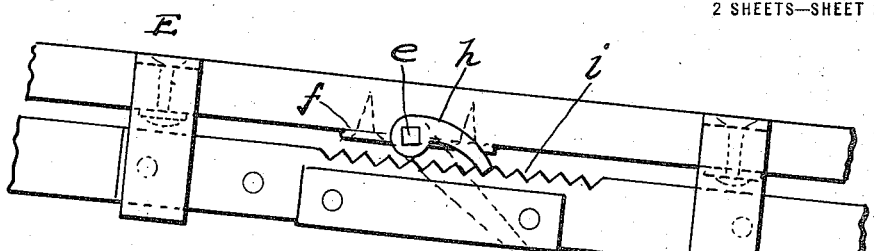
Fig. 3 is an enlarged detail showing the connection between the movable and stationary section and the locking device.
Figure 4:
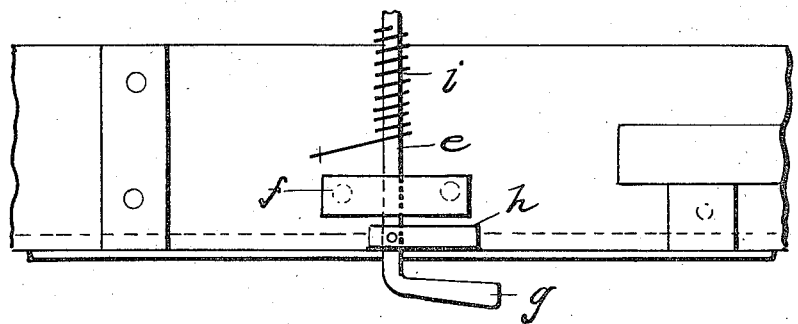
Fig. 4 is an enlarged detail in plan.
Figure 5:
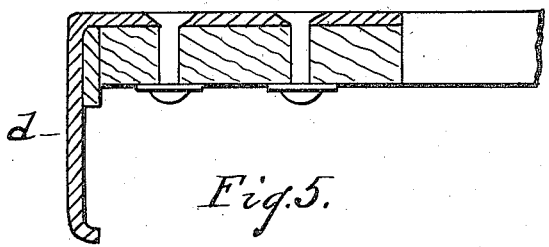
Fig. 5 is a fragmentary cross section of the movable section.
Figure 6:
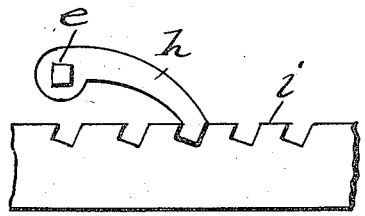
Fig. 6 shows a modified form of the locking device.

*a* designates the stationary section, *b* the movable section of the seat, the latter embodying the seat bottom and the seat back. The track *c* is secured to the side of the stationary section and hangers *d* depend from the sides of the movable section provided with in-turned lips adapted to fit under the track *c*. There are two hangers on each side. On the lower side of the movable section a cross shaft *e* is journaled by the clips *f*. On the end of this is a crank handle *g* and rigidly secured thereof a pair of pawls *h* which engage the teeth of the rack *i*. The torsional spring *j* tends to keep the pawl in engagement with the rack teeth. In Fig. 6 instead of rack teeth a plurality of notches are used. This forms a positive interlock against sliding the movable section in either direction until the locking pawl has been lifted out of the notches.

When it is desired to afford more or less leg room for one who is to occupy the seat, especially between the inclined foot boards under the cowl and the front seat, all that is necessary to do is to raise the handle *g* and slide the seat to the position desired.

What I claim is:

1. An adjustable seat for automobiles and vehicles, having in combination, a support including side uprights arranged to hold the occupant of the seat a desirable distance above the floor, a track secured near the top of one of the sides of the support and provided with a rack, a combined seat-bottom and seat-back provided with members for slidably engaging said track, a shaft journaled in said seat bottom and having a crank handle exposed at the side of the seat, a pawl fastened to said shaft, and a spring designed to normally turn the shaft and engage the pawl between the teeth of the rack.

2. An adjustable seat for automobiles and vehicles, having in combination, a support including side uprights, a track secured near the top to each side upright, a rack in connection with each track, a seat-bottom and seat-back combined together and provided with members which hold the seat-bottom to the tracks and allow it to slide thereon, a shaft journaled in the seat-bottom and passing clear across the same, a pawl near each end of the shaft, a spring for turning the shaft and causing the pawls to engage the rack, and a crank handle on one or both ends of the shaft.

In testimony whereof, I sign this specification.

EDWARD W. FOX.